Patented Oct. 12, 1948

2,451,428

UNITED STATES PATENT OFFICE 2,451,428

DIHYDROTHIOPHENES AND METHOD OF PREPARING SAME

Bernard R. Baker, Nanuet, N. Y., assignor, by mesne assignments, to American Cyanamid Company, New York, N. Y., a corporation of Maine No Drawing. Application July 16, 1945, Serial No. 605,466

10 Claims. (Cl. 260—329)

The present invention relates to new organic compounds. More particularly it relates to cyano dihydrothiophenes and methods of preparing the same.

I have found unexpectedly that cyano hydroxythiophanes can be dehydrated to produce cyano dihydrothiophenes in accordance with the following general equation:

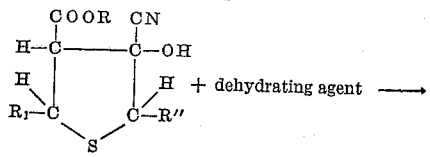

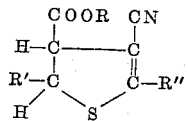

wherein R is an alkyl radical and R' and R" are members of the group consisting of hydrogen, alkyl, carbalkoxy and carbalkoxyalkyl radicals.

In the above equation the —OH group in the 3-position combines with hydrogen in the 2-position to split out water and give a double bond. While I believe this represents the reaction which usually takes place, the —OH group can also combine with the hydrogen in the 4-position forming a double bond in the 3-4 position.

The compounds prepared by methods of the present invention are generally yellow oils which can be purified by distillation. They are insoluble in water and soluble in most organic solvents such as benzene, ether, chloroform, etc.

Intermediates, found useful in the preparation of compounds of the present invention, can be prepared from known compounds by the method shown in the specific examples. Among these may be specifically mentioned: 2-(δ-carbomethoxybutyl)-3-hydroxy-3-cyano- 4 -carbomethoxythiophane, 2-(δ-carbethoxybutyl)-3-hydroxy-3-cyano-4-carbethoxythiophane, 2-(δ-carbomethoxybutyl)-3-carbomethoxy-4-cyano- 4 -hydroxythiophane, 2 -(δ-carbethoxybutyl)-3-carbethoxy-4-cyano-4-hydroxythiophane, 2-carbethoxy - 3-cyano-3-hydroxy-4-carbethoxythiophane, 2-carbomethoxy-3-cyano-3-hydroxy-4-carbomethoxythiophane, 2-carbomethoxymethyl-3-carbomethoxy-4-hydroxy-4-cyanothiophane, 2-carbomethoxymethyl-3-hydroxy-3-cyano- 4 -carbomethoxythiophane, 2-propyl-3-carbomethoxy-4-hydroxy-4-cyanothiophane, 2-propyl-3-hydroxy-3-cyano-4-carbomethoxythiophane, and the like.

In carrying out the present invention I mix the hydroxy cyanothiophane with a solvent such as benzene, pyridine, carbon tetrachloride, or mixtures thereof. The reaction mixture is cooled and kept below 50° C. while a dehydrating agent such as phosphorus oxychloride, thionyl chloride, etc. is added. The reaction mixture is allowed to stand at room temperature for from about three hours to about twenty-four hours. After the reaction is complete the mixture is poured on ice. The organic layer can be separated directly or extracted with a solvent such as ether. After washing with dilute acid and alkali the product can then be distilled.

In order that the nature of the invention may become more apparent the following compounds are among those that may be prepared by the process described herein and are listed as falling within the scope of the present invention: 2-(δ-carbomethoxybutyl) - 3 -cyano- 4 -carbomethoxy- 4,5 -dihydrothiophene, 2-(δ-carbethoxybutyl) - 3 - cyano - 4 - carbethoxy-4,5-dihydrothiophene, 2-(δ-carbomethoxybutyl) - 3 - carbomethoxy-4-cyano-2,3-dihydrothiophene, 2-(δ-carbethoxybutyl) - 3 - carbethoxy-4-cyano-2,3-dihydrothiophene, 2 - carbethoxy-3-cyano-4-carbethoxy-4,5-dihydrothiophene, 2-carbomethoxy-3-cyano-4-carbomethoxy-4,5-dihydrothiophene, 2-carbomethoxymethyl-3-carbomethoxy - 4 - cyano -2,3- dihydrothiophene, 2-carbomethoxymethyl-3-cyano-4-carbomethoxy -4,5- dihydrothiophene, 2-propyl-3-carbomethoxy - 4 - cyano -2,3- dihydrothiophene, 2-propyl-3-cyano-4-carbomethoxy-4,5-dihydrothiophene, and the like.

The compounds of the present invention are useful in the preparation of antivitamins and vitamins such as biotin.

The following specific examples illustrate the preparation of representative cyanodihydrothiophenes from the corresponding hydroxy cyanothiophanes. It will be understood, of course, that these examples are given for purposes of illustration and are not to be considered as limiting my invention to the particular details described therein.

*Example I*

To a solution of 18.5 g. of sodium methoxide and 43 g. (39 cc.) of methyl 3-mercaptopropionate in 110 cc. of methanol was added with stirring, a solution of 81 g. of methyl 2-bromopimelate in 60 cc. of methanol over a period of two hours maintaining the temperature at —22° C. to —18° C. After standing at room temperature for eight hours protected from moisture, the solution was diluted with three volumes of water and extracted twice with benzene. The combined extracts were washed with aqueous sodium bicarbonate, dilute hydrochloric acid and then distilled. A yield of 82 g. (88%) of methyl 2-carbomethoxyethylthio)-pimelate, boiling point 192°–195° C. (1 mm.) was obtained.

To a suspension of 33 g. of sodium methoxide in 500 cc. of benzene was added 135 g. of methyl 2-(carbomethoxyethylthio)-pimelate in 100 cc. of benzene. The nearly clear solution, after standing 18 hours at room temperature protected from moisture, was extracted twice with ice water, using enough to dissolve the sodium salt. The aqueous extracts were immediately run into iced hydrochloric acid, the oil extracted with benzene, washed successively with aqueous sodium bicarbonate and water, then evaporated to dryness in vacuo. A yield of 96.4 g. (80%) of 2-(δ-carbomethoxybutyl)-3-keto-4-carbomethoxythiophane was obtained as orange-yellow oil.

To a mixture of 55 g. of the product obtained immediately above and 20 cc. of liquid hydrogen cyanide at 0° C. was added 0.3 cc. of 50% aqueous potassium hydroxide. After 16 hours at 0° C., the mixture was acidified with 1 cc. of 85% phosphoric acid and volatile material removed in vacuo and finally at 100° C. A quantitative yield of 2-(δ-carbomethoxybutyl)-3-hydroxy-3-cyano-4-carbomethoxythiophane was obtained as a nearly colorless oil.

A solution of 62.5 g. of 2-(δ-carbomethoxybutyl)-3-hydroxy-3-cyano-4-carbomethoxythiophane in 100 cc. of benzene was dried with anhydrous sodium sulfate and drying agent rinsed with 50 cc. of benzene. To the solution, diluted with 150 cc. of reagent pyridine and cooled to 15° C., was added 43 cc. of phosphorus oxychloride. The temperature gradually rose to 40° C. and was occasionally cooled to maintain the temperature at 40°–48° C. In thirty minutes the heat of reaction started to subside. After a total of six hours, mixture was poured on ice. The separated organic layer, washed successively with dilute hydrochloric acid, aqueous sodium bicarbonate and dilute hydrochloric acid, was then distilled. A yield of 41 g. (70%) of 2-(δ-carbomethoxybutyl)-3-cyano-4-carbomethoxy-4,5-dihydrothiophene was obtained as a yellow oil, boiling point 192°–198° C. (1 mm.)

*Example II*

To 12.1 g. of 2-(δ-carbomethoxybutyl)-3-hydroxy-3-cyano-4-carbomethoxythiophane was added 30 cc. of benzene, 30 cc. of pyridine and 8.6 cc. of phosphorus oxychloride. The mixture was allowed to stand at room temperature for 6 hours. The initial heat of reaction was kept below 48° C. by occasional cooling. The reaction mixture was poured on ice. The seperated organic layer, washed with dilute hydrochloric acid, aqueous sodium bicarbonate and dilute hydrochloric acid, was then distilled. A yield of 6.5 g. of 2-(δ-carbomethoxybutyl)-3-cyano-4-carbomethoxy-5, 5-dihydrothiophene, boiling point 168°–175° (½–1 mm.) was obtained.

*Example III*

To a solution of 38.5 g. of 2-(δ-carbethoxybutyl)-3-carbethoxy-4-cyano-4-hydroxythiophane in 55 cc. of dry pyridine was added 25 cc. of phosphorus oxychloride in portions maintaining the temperature at 40°–50° C. with the aid of an ice bath until a solid mass was formed. After twenty hours at room temperature the mass was triturated with benzene, then poured on a mixture of ice, 50 cc. of concentrated hydrochloric acid and ether. The separated organic layer was washed with dilute hydrochloric acid, iced 5% sodium hydroxide and finally dilute hydrochloric acid. The solvent was removed in vacuo leaving 34.5 g. (96%) of 2-(δ-carbethoxybutyl)-3-carbethoxy-4-cyanodihydrothiophene as a dark oil.

*Example IV*

To a solution of 6 g. of 2-propyl-3-carbomethoxy-4-hydroxy-4-cyanothiophane in 10 cc. of dry pyridine was added 4.7 cc. of phosphorus oxychloride. The temperature gradually rose and was maintained at 38–43° C. by adequate cooling until it began to drop. After twenty hours at room temperature, the mixture was diluted with ice and hydrochloric acid. The oil was extracted with benzene, washed with dilute hydrochloric acid and distilled. A yield of 3.9 g. (71%) of 2-propyl-3-carbomethoxy-4-cyano-2, 3-dihydrothiophene was obtained as a yellow oil, boiling point 128°–132° C. (1 mm.).

*Example V*

Another reaction was carried out in the same manner as Example IV above except that 3.7 cc. of thionyl chloride was substituted for the 4.7 cc. of phosphorus oxychloride. A yield of 4.2 g. (76%) of the same product was obtained.

I claim:

1. Chemical compounds having the general formula:

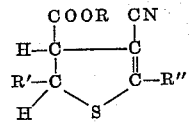

wherein R is an alkyl radical and R′ and R″ are members of the group consisting of hydrogen, alkyl, carbalkoxy and carbalkoxyalkyl radicals.

2. Chemical compounds having the general formula:

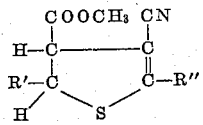

wherein R′ and R″ are members of the group consisting of hydrogen, alkyl, carbalkoxy and carbalkoxyalkyl radicals.

3. Chemical compounds having the general formula:

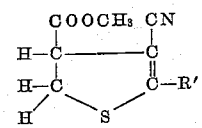

wherein R′ is a carbalkoxyalkyl radical.

4. 2-(δ-carbomethoxybutyl)-3-cyano-4-carbomethoxy-4,5-dihydrothiophene.

5. 2-(δ-carbethoxybutyl)-3-cyano-4-carbethoxy-4,5-dihydrothiophene.

6. 2-(δ-carbomethoxybutyl)-3-carbomethoxy-4-cyano-2,3-dihydrothiophene.

7. A method of preparing compounds having the general formula:

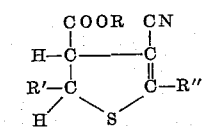

wherein R is an alkyl radical and R′ and R″ are members of the group consisting of hydrogen, alkyl, carbalkoxy and carbalkoxyalkyl radicals which comprises mixing a compound having the formula:

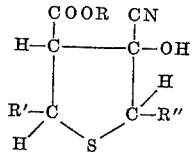

wherein R, R' and R" are as defined above with a dehydrating agent selected from the group consisting of chlorides and oxychlorides of phosphorus and sulfur in the presence of an inert organic solvent for said carbalkoxythiophane cyanohydrin.

8. The method of preparing 2-(δ-carbomethoxybutyl)-3-cyano-4-carbomethoxy-4,5-dihydrothiophene which comprises mixing 2-(δ-carbomethoxybutyl)-3-cyano-3-hydroxy-4-carbomethoxthiophane with phosphorus oxychloride in a solvent for said thiophane.

9. The method of preparing 2-(δ-carbethoxybutyl)-3-cyano-4-carbethoxy-4,5-dihydrothiophene which comprises mixing 2-(δ-carbethoxybutyl)-3-cyano-3-hydroxy-4-carbethoxythiophane with phosphorus oxychloride in a solvent for said thiophane.

10. The method of preparing 2-(δ-carbomethoxybutyl)-3-carbomethoxy-4-cyano-2,3-dihydrothiophene which comprises mixing 2-(δ-carbomethoxybutyl)-3-carbomethoxy-4-cyano-4-hydroxythiophane with phosphorus oxychloride in a solvent for said thiophane.

BERNARD R. BAKER.

REFERENCES CITED

The following references are of record in the file of this patent:

Surrey: J. Am. Chem. Soc., 66, 1933–35 (1944).